United States Patent [19]

Sarapata et al.

[11] Patent Number: 4,664,893
[45] Date of Patent: May 12, 1987

[54] METHOD FOR THE PREPARATION OF A BICARBONATE SORBENT IN FLUE GAS DESULFURIZATION

[75] Inventors: James S. Sarapata, Neshanic; Raymond Shaffery, Middletown, both of N.J.

[73] Assignee: Church and Dwight Co., Inc., Piscataway, N.J.

[21] Appl. No.: 719,907

[22] Filed: Apr. 4, 1985

[51] Int. Cl.[4] .................. C01B 17/00; C01D 7/37; C01D 7/00; C22B 26/10
[52] U.S. Cl. .................................. 423/244; 423/209; 423/422; 423/427
[58] Field of Search ............... 423/189, 209, 421, 422, 423/427, 244

[56] References Cited

U.S. PATENT DOCUMENTS

| 276,990 | 5/1883 | Carey et al. | 423/422 |
|---|---|---|---|
| 279,145 | 6/1883 | Gandolfo | 423/422 |
| 574,089 | 12/1896 | Hawliczek | 423/422 |
| 3,647,365 | 3/1972 | Saeman | 423/209 |
| 3,695,831 | 10/1972 | Goldstein | 423/189 |
| 3,719,745 | 3/1973 | Saeman | 423/427 |
| 4,115,525 | 9/1978 | Gancy et al. | 423/427 |
| 4,151,266 | 4/1979 | Rubey et al. | 423/422 |
| 4,285,925 | 8/1981 | Poncha | 423/422 |
| 4,385,039 | 5/1983 | Lowell et al. | 423/422 |
| 4,459,272 | 7/1984 | Krieg et al. | 423/422 |

FOREIGN PATENT DOCUMENTS

| 49-10197 | 1/1974 | Japan | 423/422 |
|---|---|---|---|
| 8314 | of 1895 | United Kingdom | 423/422 |

OTHER PUBLICATIONS

In re Edwards, 1956, CD 264, 109.

Primary Examiner—Gary P. Straub
Attorney, Agent, or Firm—Stiefel, Gross, Kurland & Pavane

[57] ABSTRACT

A process for the dry carbonation of an alkali metal or ammonium carbonate, utilizing a low carbon dioxide-containing carbonating gas stream, and more particularly, a process for the production of a bicarbonate sorbent useful in the desulfurization of flue gases from the low carbon dioxide-content flue gases themselves.

18 Claims, 3 Drawing Figures

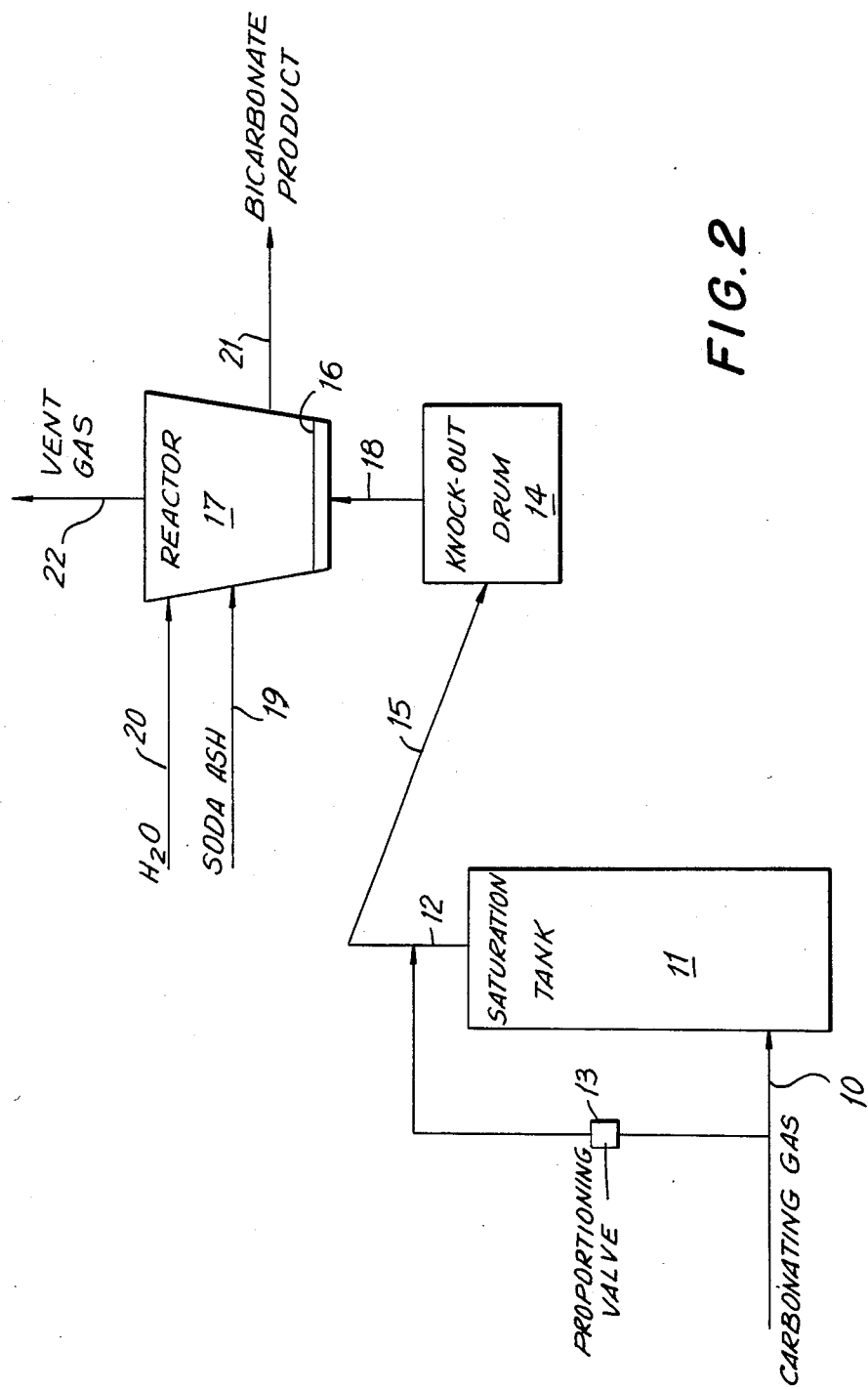

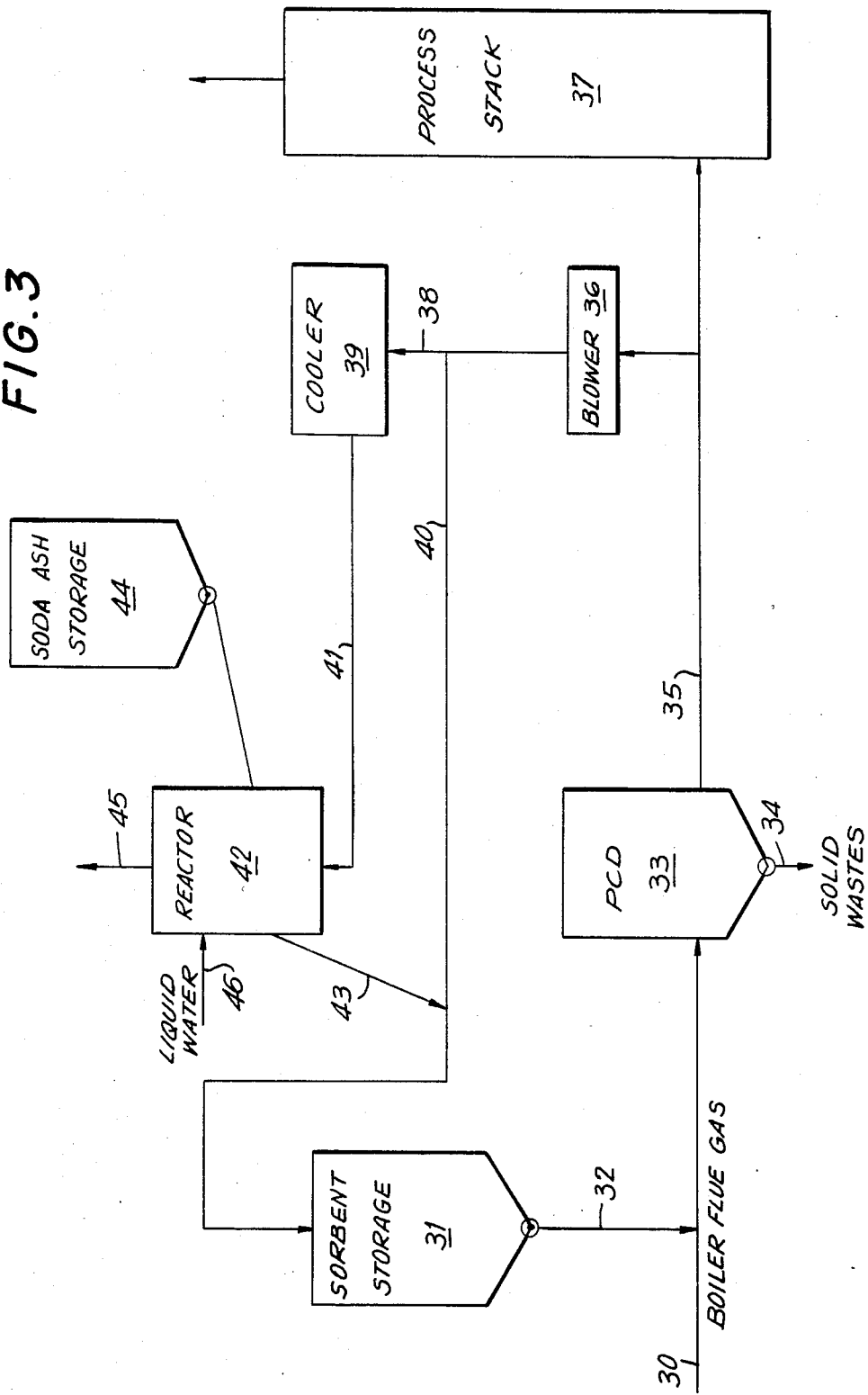

METHOD FOR THE PREPARATION OF A BICARBONATE SORBENT IN FLUE GAS DESULFURIZATION

BACKGROUND OF THE INVENTION

This invention relates to a process for the dry carbonation of an alkali metal or ammonium carbonate, utilizing a low carbon dioxide-containing carbonating gas stream. More particularly, the invention relates to such a process for the production of an alkali metal or ammonium bicarbonate sorbent useful in the desulfurization of flue gas.

The conventional technique utilized in the commercial production of sodium bicarbonate is the solution process. In the solution process, soda ash is dissolved in spent reaction liquor from prior reaction, consisting of water and small quantities of dissolved soda ash and sodium bicarbonate. The solution is then carbonated to precipitate crystals of sodium bicarbonate. The sodium bicarbonate crystals are separated from the liquor and dried to yield highly purified, high density crystals. Disadvantages of the conventional method are that the procedure requires several steps, and necessitates the use of separation equipment, drying of the product, and the handling of large volumes of liquids.

It has also been proposed to make sodium bicarbonate by various dry carbonation techniques. In U.S. Pat. Nos. 276,990 Carey et al. and 574,089 (Hawliczek), a sodium bicarbonate product is formed by placing hydrated soda ash in a revolving cylinder and then introducing carbon dioxide into the cylinder. In both patents, reaction times are of the order of five to six hours.

U.S. Pat. No. 3,647,365 (Saeman) teaches a process in which hollow sodium bicarbonate beads of low density are prepared in a multistage reactor from hydrated soda ash, small amounts of water and carbon dioxide. This process requires several steps and must proceed slowly, with carbonation times exceeding one hour and drying times up to eight hours. The soda ash must first be hydrated in a separate step and the reaction must occur at a temperature above 95.7° F. to produce commercially acceptable reaction rates.

More recently, Krieg et al. U.S. Pat. No. 4,459,272, owned by the assignee of the present invention, describes a process for the preparation of sodium bicarbonate by the reaction of a solid, particulate sodium carbonate-containing material with liquid water in a carbon dioxide-rich atmosphere. In the Krieg process the particulate mass is mixed in an internally agitated or externally rotated or vibrated reactor with the water and carbon dioxide. The reaction is carried out at temperatures of from 125° F. to 240° F. under atmospheres containing from 20% to 90% carbon dioxide by volume. The process is carried out under reduced water vapor partial pressures to promote evaporation of water from the surfaces of the reacting carbonate particles, and to maintain high carbon dioxide partial pressures in the reactor atmosphere. Products formed by the process have apparent bulk densities as high as 50–60 lbs./ft.$^3$.

Each of the previously described dry carbonation techniques is subject to particular disadvantages. In each process, the carbon dioxide concentration must be high and the reaction temperature must also be high, or the reaction rate is prohibitively low. None of these methods can produce sodium bicarbonate at low temperatures and low carbon dioxide concentrations, at commercially acceptable reaction rates.

Sodium bicarbonate has also been produced, as well as utilized, in dry sorbent injection processes for removing sulfur dioxide emissions from the combustion gases of fossil fuel-fired burners. Such techniques have commanded considerable attention recently, particularly since they present the lowest "first cost" alternative for removing potentially dangerous sulfur dioxide from flue gases. Sodium bicarbonate has been demonstrated to be a very effective sorbent in the dry sorbent injection process. However, the cost of pharmaceutical grade sodium bicarbonate, as currently produced, is a major drawback to its use for such purpose.

U.S. Pat. Nos. 3,846,535 (Fonseca) and 4,385,039 (Lowell et al) disclose methods for regenerating sodium bicarbonate from sulfate-containing solid waste formed by dry sorbent injection with sodium bicarbonate. The Fonseca regeneration step is carried out by forming an aqueous solution of the sodium sulfate-containing waste, and treating such solution with ammonium bicarbonate to precipitate sodium bicarbonate. The sodium bicarbonate is then separated, dried and recycled for further use. Lowell et al discloses a regeneration step which involves dissolving the solid desulfurization reaction product in a basic liquor, which contains borate ions and/or ammonia. Carbonation of this liquor results in a sodium bicarbonate precipitate. The Fonseca and Lowell et al processes thus both suffer from the use of complicated and capital-intensive solution operations.

It is among the objects of the present invention to provide an improved process for the production of sodium bicarbonate and other alkali metal or ammonium bicarbonates, which does not require the multiple operations required by prior art solution processes, nor is it limited to use of the high temperature, high carbon dioxide-concentration gas mixtures utilized in previous dry carbonation techniques.

A further object of the invention is to provide such a process which may be readily employed to produce bicarbonate sorbent employed in the desulfurization of flue gases, more efficiently and economically than possible utilizing previously proposed techniques.

These and other objects and advantages of the invention will be described more fully below.

SUMMARY OF THE INVENTION

In accordance with the present invention a process is provided for the dry carbonation of an alkali metal or ammonium carbonate, which comprises saturating a gas stream, containing as little as 6% carbon dioxide by volume, with water vapor; and fluidizing solid particles of the carbonate in the saturated gas stream at a temperature as low as about 85° F., the solid particles so mixing with the gas stream that transfer of $CO_2$ from the gas to the surface of the carbonate particles and transfer of the heat of reaction from the particle surfaces to the gas stream is substantially unhindered. Such efficient mixing is achieved by carrying out the carbonation within a turbulent fluidized bed into which the fluidizing gas is introduced at a velocity varying from as little as about 0.25 to as much as about 15 feet/second, depending upon the size of the carbonate particles reacted.

By so proceeding, carbonation takes place in a thin film on the carbonate particle surfaces, and may be carried out at low $CO_2$ concentrations and low reaction temperatures while still achieving commercially acceptable reaction rates and conversions. On the other hand, previously proposed dry carbonation techniques required the use of high carbon dioxide concentrations, and either required high reaction temperatures or necessitated lengthy reaction times to provide useful conversions.

In accordance with a particularly preferred embodiment of the invention, the dry carbonation process hereof is utilized in connection with desulfurizing low carbon dioxide-content flue gas streams, wherein the flue gas is contacted with a solid alkali metal or ammonium bicarbonate-containing sorbent to react with sulfur dioxide in the flue gas, and the resulting solid waste is separated and removed from the gas stream. In accordance with the present invention, the cleansed gas stream, from which the solid waste has been removed, is cooled (to a temperature as low as about 85° F.), the gas stream is saturated with water vapor, and the gas stream is thoroughly mixed with a particlulate alkali metal or ammonium carbonate in the manner indicated above. The carbonate thus produced is then utilized to contact the hot flue gas for further desulfurization thereof.

Flue gas streams from the combustion of sulfur-containing carbonaceous fuels, such as oil, coal, and coke, contain low concentrations of carbon dioxide, typically about 8–17% by volume. As illustrated in the following table, flue gases also contain amounts of about 3–18% water vapor, 2–4% oxygen, 68–77% nitrogen, and up to about 0.5% sulfur dioxide, by volume:

| | COMMON COMBUSTION MATERIALS AND THEIR TYPICAL FLUE GAS ANALYSES | | | | | | | | | | | | |
|---|---|---|---|---|---|---|---|---|---|---|---|---|---|
| | ULTIMATE ANALYSIS (% BY WT.) | | | | | | | FLUE GAS ANALYSIS (% BY VOL.) | | | | | Sat. Temp. |
| Fuel | S | C | H | N | O | $H_2O$ | Ash | $O_2$ | $N_2$ | $CO_2$ | $SO_2$ | $H_2O$ | °F. |
| Natural Gas | 0 | 74.7 | 23.3 | 0.8 | 1.2 | 0 | 0 | 2.5 | 71.3 | 8.5 | 0 | 17.7 | 136 |
| #2 oil | 0.1 | 87.4 | 12.5 | 0 | 0 | 0 | 0 | 3 | 73.6 | 11.6 | .005 | 11.8 | 96 |
| #6 oil | 0.5 | 88 | 11 | 0 | 0 | 0 | 0.5 | 3 | 73.9 | 12.1 | .026 | 10.9 | 93 |
| Eastern Coal | 4 | 57.5 | 3.7 | 0.9 | 5.9 | 12 | 16.0 | 3.25 | 73.5 | 13.8 | .36 | 9.1 | 88 |
| Western Coal | 0.48 | 47.9 | 3.4 | 0.6 | 10.9 | 30.4 | 6.4 | 3.1 | 69.9 | 13.6 | .051 | 13.4 | 126 |
| Lignite | 0.7 | 39.7 | 2.9 | 0.7 | 10.3 | 34.9 | 10.8 | 3.0 | 68.2 | 13.3 | .09 | 15.4 | 130 |
| Coke Breeze | 0.6 | 80 | 0.3 | 0.3 | 0.5 | 7.3 | 11.0 | 3.4 | 76.5 | 16.7 | .05 | 3.3 | 79 |
| Spruce Bark | 0.1 | 51.8 | 5.7 | 0.2 | 38.4 | 0 | 3.8 | 3.1 | 70.5 | 14.8 | .01 | 11.6 | 96 |

From the preceding, it is apparent that two of the three ingredients required to form sodium bicarbonate from soda ash—carbon dioxide and water—are already present in flue gas streams.

Dry carbonation is theoretically feasible under atmospheric pressure, 100% relative humidity, in area ABCD of FIG. 1 of the accompanying drawings. Prior art disclosures have only described dry carbonation techniques in the area GECF. The region covered in presently known processes is so much less than the theoretical region in which reaction may be effected because commercially acceptable reaction rates and yields could not previously be obtained at lower temperatures and carbon dioxide concentrations. For instance, below 125° F. the reaction rates in prior art procedures are too slow to be of commercial significance, even at very high carbon dioxide concentrations. Furthermore, employing such procedures reaction rates are too slow to be of commercial significance, regardless of the reaction temperature, when carbon dioxide concentrations are below 20% by volume.

In accordance with the process of the present invention, it has been found that the region of effective dry carbonation can be expanded to cover the additional shaded region HIEGFJ shown in FIG. 1, which permits commercially feasible carbonations employing gas mixtures containing as little as about 6% by volume carbon dioxide, at carbonation temperatures as low as about 85° F.

Thus, in its preferred form, the present invention provides an efficient technique for producing an alkali metal or ammonium bicarbonate-based sorbent in the very desulfurizing process in which the sorbent is required. The cost of producing, for example, a sodium bicarbonate-based sorbent by the present technique is far below that of producing a conventional pharmaceutical grade sodium bicarbonate sorbent, since soda ash is the only extrinsic raw material required for use in the process. As noted above, the other reactants required, carbon dioxide and water, are contained in the flue gas and, therefore, do not have to be purchased or added to the carbonation reaction in a separate step. The bicarbonate product may thus be directly and efficiently produced from flue gas with minimum processing.

Furthermore, the process of the present invention produces a bicarbonate of sorbent quality which is uniquely suited for the dry sorbent injection process for desulfurizing flue gas, in that its particles are coarse, having high surface areas of about 0.4 to 0.55 meter$^2$/g., and low bulk densities of about 30–40 lbs./ft$^3$. The use of a high surface area, low bulk density sorbent in flue gas desulfurization is desirable, since the sorption of sulfur oxides is believed to be surface related. On the other hand, commercially produced sodium bicarbonate has a surface area of about 0.1 meter$^2$/g., and a specific density of about 50–60 lb/ft$^3$.

The particulate carbonate reactant employed in the present process may comprise any alkali metal and/or ammonium carbonate-containing material such as anhydrous sodium carbonate (soda ash), a sodium carbonate hydrate (e.g., sodium carbonate monohydrate), sodium sesquicarbonate, Wegscheider's salt, trona (whether or not calcined), the corresponding potassium or ammonium carbonates, mixtures thereof, or the like. The materials used can be pure or technical grades, or mixtures of carbonates with other materials, e.g., sodium chloride. In the following description, the process of the invention will be illustrated in connection with the preferred carbonation of soda ash. It will, however, be understood that the invention is not limited to the use of soda ash, as any of the previously mentioned carbonate-containing materials can be employed therein.

BRIEF DESCRIPTION OF THE DRAWINGS

FIG. 2 is a schematic flow diagram of one embodiment of the process of the invention; and FIG. 3 is a schematic flow diagram of a preferred embodiment of the process utilized in connection with the desulfurization of flue gas.

PREFERRED EMBODIMENTS OF THE INVENTION

Figure 1:
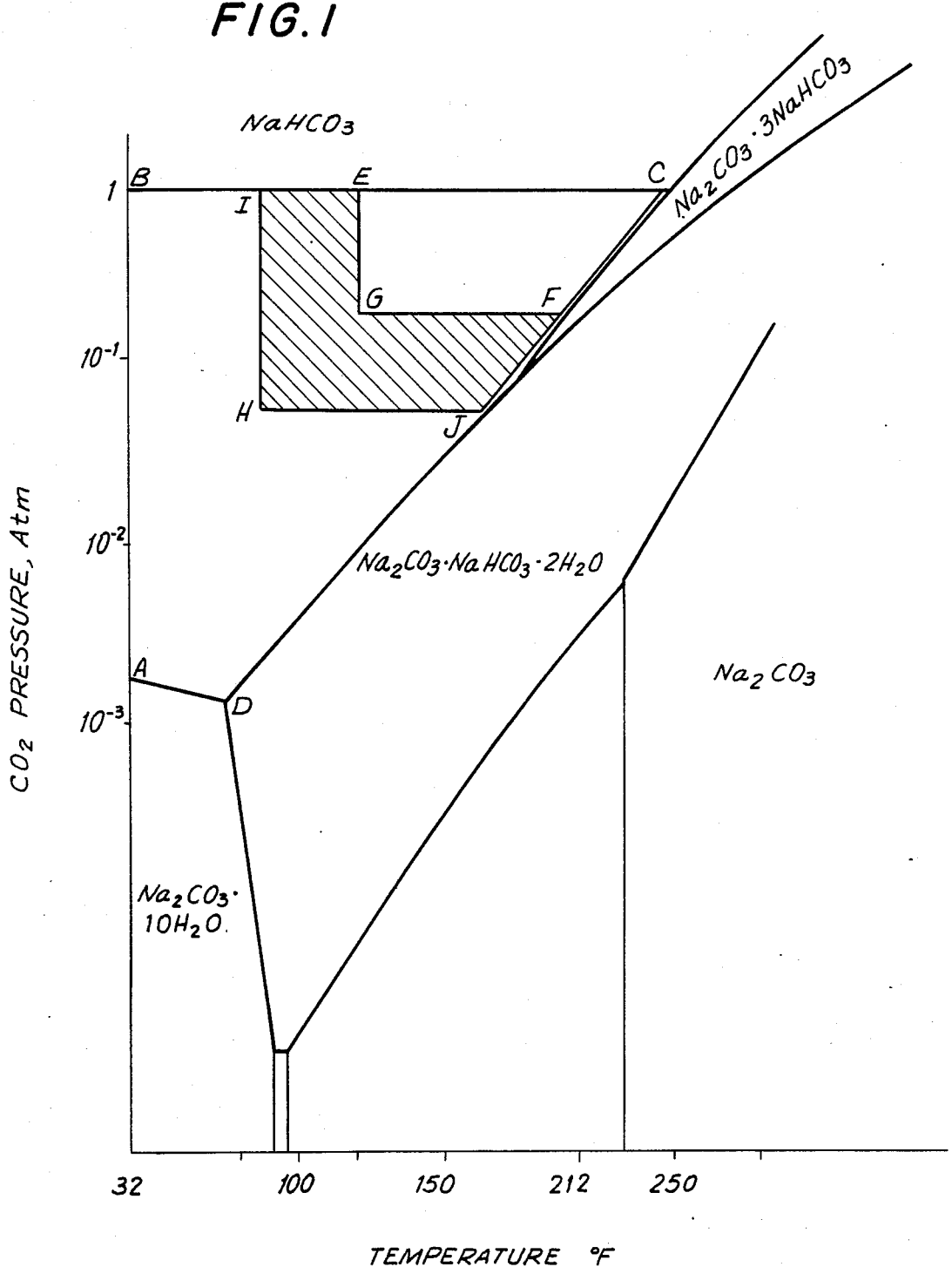
FIG. 1 is an equilibrium phase diagram of the system sodium carbonate, carbon dioxide and water (at 100% relative humidity), illustrating the region in which dry carbonation processes have previously been described and the additional region in which the process of the invention is operative.

A flow sheet illustrating one embodiment for carrying out the process of the invention appears in FIG. 2 of the drawings. As shown therein, a carbonating gas stream 10 is introduced into a saturation tank 11, where the gas is saturated with water vapor. A portion of the gas stream 10 may be diverted from the saturation tank 11 through a proportioning valve 13. The gas stream exiting the tank 11 or valve 13 then enters a knockout drum 14, which removes entrained liquid water from the gas stream. After the knockout drum 14, the saturated gas stream enters a fluidized bed reactor 17, where it is thoroughly mixed with particles of soda ash to produce sodium bicarbonate.

The saturation tank 11 contains water or a salt solution which may be maintained at a temperature approximately equal to the desired reaction temperature in reactor 17. The gas stream 10 entering the tank is heated or cooled to the desired temperature and leaves the tank 11 through line 12, saturated with water at the temperature of the salt solution in the saturation tank. If desired, a portion of the carbonating gas stream 10 is passed through the proportioning valve 13, by-passing saturation tank 11 and being re-mixed with saturated gas stream 12 after the latter exits from the saturation tank. In this manner, both the temperature and moisture content of the carbonating gas stream is precisely regulated.

Gas stream 15 is thereafter fed into a knockout drum 14, which removes entrained liquid water and minimizes any fouling of a gas distribution plate 16 in the fluidized bed reactor 17 downstream thereof.

The gas stream 18 removed from the knockout drum is mixed in the fluidized bed of reactor 17 with a particulate soda ash feed 19 and, optionally, with liquid water which may be sparged into the bed through line 20. The soda ash may be added batchwise, or continuously, at a rate proportional to the conversion to bicarbonate. The liquid water may be added to control the rate of reaction or the reaction temperature by providing evaporative heat removal. In many cases no liquid water need be added at all. The deliquescent properties of some of the carbonate reactants is sufficient to remove enough water from the saturated carbonating gas to allow the reaction to proceed without the further addition of liquid water.

As indicated hereinabove, to effect thorough mixing of gas stream 18 and particulate soda ash feed 19 it is critical to carry out the carbonation in a turbulent fluidized bed under conditions which produce thorough contact between the solid and gaseous reactants with substantially complete back mixing and heat transfer therebetween. Such conditions are insured by introducing the fluidizing gas into the fluidized bed at rates varying from about 0.25 to 15, preferably about 0.5 to 10, feet/second. In particular, employing fine soda ash particles (e.g., particles of the order of 2 microns) the carbonating gas stream may be introduced into the fluidized bed at rates as low as 0.25 ft./sec. and still produce turbulent flow conditions therein. On the other hand, when coarse soda ash particles are reacted (e.g., particles of the order of 200 microns), it may be necessary to introduce the carbonating gas at velocities of up to 10 ft./sec., or even as much as 15 ft./sec., to effect fluidization.

These conditions may be provided in either a conventional gas fluidized bed reactor in which the energy required to fluidize the soda ash particles is imparted to the carbonating-gas stream, or in a mechanically fluidized bed wherein the solid particles are mechanically accelerated through the gaseous medium to effect turbulent fluidization thereof. In a mechanically fluidized bed the flow rate of the carbonating-gas stream must at least be equal to that necessary to supply the gaseous reactants and to remove the heat of reaction. In a gas fluidized bed the gas feed rate must also be sufficient to produce turbulent fluidization; in most instances, such feed rate is significantly greater than that required for adequate feed of the reactants and heat removal. Employing such conditions commercially acceptable carbonation rates are obtained, employing gas streams containing as little as about 6–17% $CO^2$ by volume, at temperatures as low as about 85° F. and up to about 200° F., preferably about 100°–190° F.

In accordance with another important feature of the invention, the carbonating-gas stream in reactor 17 is maintained under substantially saturated conditions, i.e., the moisture content in the fluidized bed is maintained at at least about 90% of saturation at the reaction temperature utilized, either by feeding carbonating gas stream 10 solely through saturation tank 11 or by additionally vaporizing some liquid water sprayed into the reactor. As long as a minimum of 90% relative humidity is maintained in the fluidized bed, more water is adsorbed onto the surfaces of the reacting soda ash particles than is evaporated therefrom. In this manner, the presence of sufficient water on the surfaces of the reacting particles is assured, and the carbonation reaction proceeds at commercially acceptable rates.

Following carbonation in reactor 17 the bicarbonate product is discharged from line 21, and the unreacted gas is continuously removed overhead through vent 22.

It should be understood that the unit operations depicted in FIG. 2 may vary widely without departing from the scope of this invention. For instance, the saturation tank 11 may be replaced by an externally cooled or heated heat exchanger followed by a water spray for saturating the carbonating gas stream. Similarly, the knockout drum 14 may be a demister pad or may be dispensed with if not required by the particular design of the fluidized bed reactor 17 employed.

A preferred embodiment of the carbonation process hereof resides in the desulfurization of flue gases by the dry injection technique. The invention makes possible the direct use of low carbon dioxide-content flue gas containing about 8–17%, typically about 10–13%, $CO_2$ by volume. For example, as illustrated in FIG. 3, in one preferred embodiment a boiler flue gas stream 30 containing fly ash and sulfur dioxide, is recovered from a boiler at approximately 300° F. As indicated above, such a stream may typically incorporate about 8 to 17% carbon dioxide, 2–4% oxygen, 68–77% nitrogen, 3–18% water vapor, and up to 0.5% sulfur dioxide, by volume. The flue gas is mixed with a sodium bicarbonate-based sorbent which may also contain, for example, sodium carbonate and sodium sulfate, metered from a storage bin 31 into the flue gas stream via line 32, the sorbent reacting with the sulfur dioxide in a particulate collection device (PCD) 33.

Solid wastes 34 are discharged from the PCD 33 and a clean flue gas stream 35 exits the PCD and is vented through a process stack 37. A blower 36 is provided intermediate to the PCD 33 and the process stack 37. About 5% of the cleansed gas stream is removed through blower 36 and directed via first substream 38 to a cooler 39, and a second substream 40 back to the sorbent storage bin 31. From the cooler 39, the flue gas stream 41 is passed through a fluidized bed reactor 42 in which, in accordance herewith, it is intimately mixed and reacted with particles of soda ash, thereby producing sodium bicarbonate useful as a sorbent in the process.

In operation, the flue gas stream 30 containing the fly ash and sorbent passes into the PCD 33 and through a filter medium where the fly ash and sorbent are separated. The sorbent begins to react with the sulfur dioxide in the gas stream as soon as the two come into contact. The reaction continues as the gas passes through the sorbent on the filter medium until about 95% of the bicarbonate has been converted by the reaction:

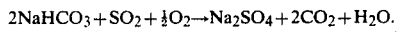

$$2NaHCO_3 + SO_2 + \tfrac{1}{2}O_2 \rightarrow Na_2SO_4 + 2CO_2 + H_2O.$$

The fly ash, unreacted sorbent, and sodium sulfate collected in the PCD 33 are discharged through line 34 for collection as solid waste. The flue gas stream 35 exiting the PCD 33 is slightly cooler, about 290° F., and about the same composition as the gas entering, except that it has been cleansed of fly ash and 75% of its sulfur dioxide content. Most of this cleansed flue gas stream, about 95%, is exhausted to the atmosphere through the process stack 37.

About 5% of the clean flue gas stream 35 is removed before the process stack 37 with a blower 36 in order to supply carbon dioxide and heat energy for the bicarbonate sorbent manufacturing process. Downstream from the blower 36, the flue gas substream 38 to flue gas cooler 39 is cooled from about 290° F. to about 122° F., the temperature at which the gas stream becomes saturated with its own water of combustion. The second substream 40, at about 290° F., is used to dry and convey a sorbent feed 43 from reactor 42 to the sorbent storage bin 31.

The saturated flue gas stream 41 exits the cooler 39 and enters the fluidized bed reactor 42. Soda ash is metered from a storage bin 44 into the reactor and the gas stream is intimately mixed with the soda ash in the fluidized bed. Liquid water may also be metered into the reactor through line 46, forming a film on the soda ash particles in the bed. The bicarbonate reaction product is removed through stream 43, and waste gas is vented through line 45 after the removal of particulates.

About 10% of the carbon dioxide entering with the clean flue gas reacts with the soda ash to form bicarbonate. Water from the saturated flue gas is also used in the formation of the reaction product. The soda ash adsorbs the water required for reaction and some excess water from the flue gas stream, resulting in a moist product.

The carbonation reaction only occurs when an aqueous, $CO_2$-containing film forms around the soda ash particles. Such a film forms more rapidly when liquid water is added directly to the soda ash particles rather than waiting for the carbonate to adsorb sufficient water from gas stream 41. Accordingly, in the preferred form of the invention illustrated in FIG. 3 liquid water is sprayed or sparged into the reactor through line 46. When gas stream 41 is maintained at least at 90% of saturation, greatest carbonation rates are obtained by thus adding about 1–2 times, preferably about 1.5 times, the amount of water required for stoichiometric reaction, to the fluidized bed in liquid form. If, on the other hand, the carbonating gas stream contains lesser amounts of water, it may be necessary to add additional liquid water to the reactor in order to maintain the requisite 90% relative humidity (preferably 95% relative humidity) in the fluidized bed.

The unreacted carbon dioxide and water vapor, along with any inert gases, are used to remove the heat of reaction from the fluidized bed so that the temperature of the reaction mixture is only incrementally higher than the temperature of the cooled flue gas entering reactor 42.

It may be noted that the clean flue gas stream 41 fed to the fluidized bed reactor 42 still contains about 100 ppm by volume of sulfur dioxide, which competes with carbon dioxide for reaction with the sodium carbonate. However, since the carbon dioxide concentration is about one thousand times greater than the sulfur dioxide concentration, the finished, dry sorbent contains no more than about 5% by weight of the corresponding sulfate salt.

The following examples further illustrate preferred embodiments of the invention:

EXAMPLE I

Sodium Bicarbonate Production and Use in Flue Gas Desulfurization

A 500 MW steam power plant using low sulfur western coal will, typically, in one hour of operation provide flue gas having the following analysis:

| Component | Pounds | % By Volume |
| --- | --- | --- |
| Fly Ash | 38,200 | — |
| $CO_2$ | 1,140,000 | 11.7 |
| $H_2O$ | 470,000 | 11.8 |
| $N_2$ | 4,395,000 | 71.1 |
| $O_2$ | 395,000 | 5.3 |
| $SO_2$ | 6,200 | 0.04 |

Of the 6200 pph of $SO_2$, typically 75% or 4,650 pph must be removed in order to meet air quality emissions standards. The temperature of the flue gas at this point is nominally 300° F.

Employing the system schematically illustrated in FIG. 3, 13,700 pph of a sodium bicarbonate-based sorbent of the following composition is metered into the flue gas stream 30 before it enters the baghouse or PCD 33: $NaHCO_3$-90%, $Na_2CO_3$-5% and $Na_2SO_4$-5%. The fly ash, spent sorbent, and sodium sulfate waste stream 34 is discharged from the baghouse in a cyclic manner and sent to a solids waste landfill area. The quantity of waste per hour is, nominally: fly ash—38,200 lbs; sodium sulfate—10,600 lbs; sodium carbonate—1,100 lbs.

Nominally, 5% of the clean gas stream 35, or about 322,000 pph, is removed before the process stack 37 by means of blower 36. About 182,000 pph of the clean flue gas passes through heat exchanger 39 where it is cooled to 115° F. in order to saturate the gas. The saturated flue gas stream 41, at 115° F., enters fluidized bed reactor 42 where it contacts soda ash, which is fed in at a rate of about 8,650 pph, to produce sodium bicarbonate.

The composition of the sorbent product stream 43 leaving the reactor is approximately: $NaHCO_3$, 86%; $Na_2CO_3$, 5%; $Na_2SO_4$, 5%; $H_2O$, 4%. This material is conveyed from reactor 42 to the sorbent storage bin 31 by substream 40 of the hot, clean flue gas stream removed from the blower 36.

The following further examples were carried out in an experimental apparatus similar to the design depicted in FIG. 2. The reactor was a fluidized bed using between 20 and 30 ACFM of gas volume. The reactor was operated in a batch mode with solid reactant(s) equivalent to nominal 500 gram charges of sodium carbonate. In each of the examples, the temperatures of the reaction mixtures peaked within 1° to 10° F. higher than the reactant gas temperatures. Generally, 1% to 10% of the carbon dioxide in the inlet gas stream was consumed in the reactions:

EXAMPLE II

Carbonation of a 30% $CO_2$ Stream at 194° F.

Carbon dioxide gas saturated with water vapor at 194° F., (30% $CO_2$, 70% $H_2O$) was used to fluidize 500 grams of anhydrous soda ash. The gas flow was stopped in 20 minutes and the material in the reactor assayed at 87% sodium bicarbonate on a dry basis.

EXAMPLE III

Carbonation of a 13.5% $CO_2$ Stream at 158° F.

A gas stream saturated with water at 158° F., containing 13.5% carbon dioxide by volume, was used to fluidize a solid bed consisting initially of 306.6 grams of anhydrous soda ash and 306.6 grams of dry sodium bicarbonate. 87 grams of liquid water was sprayed on to the reaction mass over a period of 3 minutes. In 45 minutes the gas flow was stopped and the material in the reactor assayed at 96.5% sodium bicarbonate on a dry basis. The bulk density of the product was 37 lb./ft$^3$.

EXAMPLE IV

Carbonation of a 10.7% $CO_2$ Stream at 122° F.

A gas stream saturated with water vapor at 122° F., containing 10.7% carbon dioxide by volume, was used to fluidize a solid bed initially containing 221 grams of anhydrous soda ash and 442 grams of dry sodium bicarbonate. 62.5 grams of water was sprayed on to the reaction mass over a period of 2 minutes. Samples extracted from the mass after 40 minutes and 50 minutes assayed at 90% and 97.5% sodium bicarbonate, on a dry basis, respectively. The bulk density of the product was 28 lb./ft$^3$.

EXAMPLE V

Carbonation of a 6.2% $CO_2$ Stream at 122° F.

A gas stream saturated with water vapor at 122° F., containing 6.2% carbon dioxide by volume, was used to fluidize a bed of solids with the same composition as in Example III. 62.5 grams of water was sprayed on to the reaction mass over a period of 2 minutes. After 70 minutes the reactor contents were analyzed and found to contain 95% sodium bicarbonate on a dry basis. The bulk density of the product was 37 lb./ft$^3$.

EXAMPLE VI

Carbonation of an 11.3% $CO_2$ Stream at 87.8° F.

A gas stream saturated with water vapor at 87.8° F., and containing 11.3% carbon dioxide by volume, was used to fluidize a solid bed containing 500 grams of anhydrous soda ash. 142 grams of liquid water was sprayed onto the reaction mass over a period of 110 minutes. After 260 minutes of reaction time the reactor contents assayed 91% sodium bicarbonate on a dry basis. The bulk density of the product was 39 lb./ft$^3$.

EXAMPLE VII

Carbonation of a 14.3% $CO_2$ Stream at 87.8° F.

A gas stream saturated in water vapor at 87.8° F., containing 14.3% carbon dioxide by volume, was used to fluidize a solid bed containing 500 grams of anhydrous soda ash. 142 grams of liquid water was sprayed onto the reaction mass over a period of 45 minutes. Samples extracted after 160 and 180 minutes assayed 89% and 95% sodium bicarbonate on a dry basis, respectively. The bulk density of each product was 37 lb./ft$^3$.

The products of Example II–VII are especially suited for use as sorbents for flue gas desulfurization. Sodium bicarbonate thus produced has a density of $\frac{1}{2}$ to $\frac{2}{3}$ that of solution crystallized sodium bicarbonate, which has a bulk density of 60 lb./ft$^3$. The lower bulk density facilitates conveying in the flue gas stream and more even distribution on the filter surfaces. The dry carbonated particles are more friable than their solution-carbonated counterparts. Where it is desirable to reduce particle size to optimize flue gas desulfurization, products so prepared require less energy for size reduction.

It will be understood that various changes may be made in the preferred embodiments of the process described hereinabove without departing from the scope of the present invention. Accordingly, the preceding description should be interpreted as illustrative only.

We claim:

1. A process for the dry carbonation of an alkali metal or ammonium carbonate selected from the group consisting of soda ash, sodium carbonate monohydrate, sodium sesquicarbonate, trona, the corresponding potassium or ammonium carbonates, and mixtures thereof, consisting essentially of:
    (a) substantially saturating a gas stream containing from 6% to 17% carbon dioxide by volume with water vapor, the moisture content of the gas stream being at least 90% of saturation at the temperature at which the gas stream reacts in step (b); and
    (b) reacting solid particles of the carbonate with the gas stream in a turbulent fludiized bed at temperatures of from 100° F. to 200° F., while maintaining a relative humidity of at least 90% in the vapor phase adjacent the particles, to produce an aqueous film on the carbonate particles and provide unhindered transfer of carbon dioxide from the gas stream to the surface of the carbonate particles and unhindered transfer of the heat of reaction from the surface of the carbonate particles to the gas stream, to produce the alkali metal or ammonium bicarbonate per se.

2. The process of claim 1, wherein the carbonate is soda ash.

3. The process of claim 2, in which liquid water is added to the soda ash particles in an amount of 1-2 times the amount required for stoichiometric reaction.

4. The process of claim 1, wherein the bed is gas-fluidized in step (b) by introducing the gas stream into the bed at rates varying from 0.25 to 15 feet/second to produce thorough contact between the solid and gaseous reactants with substantially complete back mixing and heat transfer therebetween.

5. The process of claim 1, wherein the bed is mechanically fluidzied in step (b) to produce thorough contact between the solid and gaseous reactants with substantially complete back mixing and heat transfer therebetween.

6. The process of claim 1, wherein the gas stream saturated in step (a) is a flue gas stream containing the following components:

| Component | % By Volume |
|---|---|
| carbon dioxide | 8-17% |
| oxygen | 2-4% |
| nitrogen | 68-77% |
| water vapor | 3-18% |
| sulfur dioxide | up to 0.5% |

7. The process of claim: 1, wherein the reaction is carried out in step (b) at temperatures of from 100° to 190° F.

8. The process of claim 1, wherein the gas stream saturated in step (a) is a flud gas stream prepared from a sulfur-containing carbonaceous fuel.

9. The process of claim 8, wherein the carbonaceous fuel is coke breeze, Eastern Coal, or #6 fuel oil.

10. A process for desulfurizing hot flue gas containing from 8% to 17% carbon dioxide by volume, consisting essentially of:
  (a) contacting the flue gas with the solid alkali metal or ammonium bicarbonate-containing sorbent made in step (e) to react with sulfur dioxide in the flue gas;
  (b) separating the resulting solid waste and removing it from the gas stream;
  (c) cooling the cleansed gas stream, from which the solid waste has been removed, to temperature of from 100° F. to 200° F.;
  (d) substantially saturating the gas stream with water vapor, the moisture content of the gas stream being at least 90% of saturation at the temperature at which the gas stream reacts in step (e);
  (e) thoroughly mixing the gas stream with an alkali metal or ammonium carbonate selected from the group consisting of soda ash, sodium carbonate monohydrate, sodium sesquicarbonate, trona, the corresponding potassium or ammonium carbonates, and mixtures thereof, in essentially dry, particulate form in a turbulent fluidized bed at temperatures of from 100° F. to 200° F., while maintaining a relative humidity of at least 90% in the vapor phase adjacent the carbonate particles, to form an aqueous film on the particles and provide unhindered transfer of carbon dioxide from the gas stream to the particle surfaces and unhindered transfer of the heat of reaction from the particle surfaces to the gas stream, to thereby produce the bicarbonate of said alkali metal or ammonium bicarbonate; and
  (f) supplying the bicarbonate thus produced to step (a) to contact the hot flue gas in an amount sufficient for desulfurization thereof.

11. The process of claim 10, wherein the carbonate reacted in step (e) is soda ash.

12. The process of claim 10, in which liquid water is added to the soda ash particles in an amount of 1-2 times the amount required for stoichiometric reaction.

13. The process of claim 10, wherein the bed is gas-fluidized in step (e) by introducing the gas stream into the bed at rates varying from 0.25 to 15 feet/second to produce thorough contact between the solid and gaseous reactants with substantially complete back mixing and heat transfer therebetween.

14. The process of claim 10, wherein the bed is mechanically fluidized in step (e) to produce thorough contact between the solid and gaseous reactants with substantially complete back mixing and heat transfer therebetween.

15. The process of claim 10, wherein the gas stream saturated in step (d) is a flue gas stream containing the following components:

| Component | % By Volume |
|---|---|
| carbon dioxide | 8-17% |
| oxygen | 2-4% |
| nitrogen | 68-77% |
| water vapor | 3-18% |
| sulfur dioxide | up to 0.5% |

16. The process of claim 10, wherein the reaction is carried out in step (e) at temperatures of from 100° F. to 190° F.

17. The process of claim 10, wherein the gas stream saturated in step (d) is a flue gas stream prepared from a sulfur-containing carbonaceous fuel.

18. The process of claim 17, wherein the carbonaceous fuel is coke breeze, Eastern Coal, or #6 fuel oil.

* * * * *